(12) United States Patent
Stopler et al.

(10) Patent No.: US 9,338,791 B2
(45) Date of Patent: May 10, 2016

(54) METHOD AND APPARATUS FOR IMPROVING TRANSMISSION RELIABILITY IN WIRELESS COMMUNICATIONS NETWORK

(75) Inventors: Dan Stopler, Holon (IL); Amir Francos, Tel-Aviv (IL)

(73) Assignee: ALVARION LTD., Tel Aviv (IL)

( * ) Notice: Subject to any disclaimer, the term of this patent is extended or adjusted under 35 U.S.C. 154(b) by 1730 days.

(21) Appl. No.: 12/046,220

(22) Filed: Mar. 11, 2008

(65) Prior Publication Data

US 2009/0232092 A1 Sep. 17, 2009

(51) Int. Cl.
*H04W 4/00* (2009.01)
*H04W 72/12* (2009.01)
*H04W 88/06* (2009.01)
*H04W 88/10* (2009.01)

(52) U.S. Cl.
CPC .......... *H04W 72/1215* (2013.01); *H04W 88/06* (2013.01); *H04W 88/10* (2013.01)

(58) Field of Classification Search
CPC . H04W 16/14; H04W 72/04; H04W 72/1215; H04W 88/06; H04W 88/10
USPC .............. 370/312, 333, 331, 310.2, 252, 254, 370/329, 389, 338, 349, 437, 463, 370/465–468; 455/422.1
See application file for complete search history.

(56) References Cited

U.S. PATENT DOCUMENTS

| | | | | |
|---|---|---|---|---|
| 2003/0054846 | A1* | 3/2003 | Parry | 455/517 |
| 2004/0002312 | A1* | 1/2004 | Li et al. | 455/232.1 |
| 2004/0120421 | A1* | 6/2004 | Filipovic | 375/316 |
| 2004/0185887 | A1* | 9/2004 | Wolman et al. | 455/516 |
| 2005/0036573 | A1* | 2/2005 | Zhang et al. | 375/343 |
| 2006/0271780 | A1* | 11/2006 | Oswal et al. | 713/163 |
| 2008/0159239 | A1* | 7/2008 | Odlyzko et al. | 370/337 |
| 2008/0159334 | A1* | 7/2008 | Venkatachalam et al. | 370/479 |
| 2008/0175184 | A1* | 7/2008 | Chindapol et al. | 370/315 |
| 2008/0285504 | A1* | 11/2008 | Lin | 370/319 |
| 2008/0311873 | A1* | 12/2008 | Kim et al. | 455/272 |
| 2009/0016297 | A1* | 1/2009 | Lee | 370/331 |
| 2009/0129367 | A1* | 5/2009 | Bitran | 370/350 |
| 2010/0316025 | A1* | 12/2010 | Brandt et al. | 370/336 |

* cited by examiner

*Primary Examiner* — Luat Phung

(74) *Attorney, Agent, or Firm* — Browdy and Neimark, PLLC

(57) ABSTRACT

There is provided a method and apparatus for allocating transmission resources in a wireless network in which some of the terminals communicate with the base station by exchanging communication frames that are compatible with a first communication protocol while other terminals receive communications from the base station that are compatible with a second communication protocol by using non-standardized communication frames or communication frames that are compatible with another standardized protocol. The base station transmits a plurality of frames, some of which are compatible with the first communication protocol while others— with the second communication protocol. The terminals that are operative to receive frames of the second communication protocol are capable of decoding frames that are compatible with both communication protocols, whereas terminals that are operative to receive frames of the first communication protocol are capable of decoding only standardized communication frames of the first communication protocol.

14 Claims, 2 Drawing Sheets

METHOD AND APPARATUS FOR IMPROVING TRANSMISSION RELIABILITY IN WIRELESS COMMUNICATIONS NETWORK

FIELD OF THE INVENTION

The present invention relates to method and apparatus adapted to improve transmission reliability in wireless communications systems, and more particularly to improved coverage of control channel.

BACKGROUND OF THE INVENTION

Many modern wireless systems operate in reuse-1, that is, all cellular cells in the deployment use the same operation frequency. For this purpose a cell is typically defined as a radio entity, corresponding to transmission of one sector over one carrier. A site is defined as a geographical entity (i.e. location), which typically contains 1-6 sectors, and thus has at least 1-6 cells (the number of cells exceeds the number of sectors if more than one carrier is available). Using the same frequency reduces the frequency resources required to deploy a cellular service, however it also causes interference between adjacent cells. To overcome the interference, modern wireless international standards suggest utilizing different tools, one of the primary tools is to assign to each cell a different spreading sequence (CDMA) or permutation (OFDMA). One of the problems associated with the use of an International Recommendation such as the WiMAX Forum Mobile System Profile, is, that while it allows efficient reuse-1 operation for transferring data by using different permutations, the WiMAX maps (control channel) are not similarly equipped to handle reuse-1. The control channel in WiMAX defines areas in a two dimensional region of frequency subchannels and time domain symbols. A subchannel is a logical definition of a granular unit in the frequency domain.

In order to comply with various standards such as the WiMAX, the compatible signals are divided into fixed time frames, where each frame comprises several parts. The frame MAP zone—a control channel describing the following Down Link and Uplink data bursts in addition to other signals constituting the frame; Down Link Zone—containing Data bursts from base station (BS) to mobile station (MS); Feed Back zone—containing various mobile station (MS) to Base station (BS) signaling; and finally Uplink Zone—containing data bursts from MS to BS. For all zones except for the MAP zones, different cells may use different permutations.

Permutations are one of the tools used by OFDMA to provide averaging of interference. Each BS may use all OFDMA tones for transmission, but orders them differently. Now let us assume that the first BS OFDMA transmission is divided into many sub-channels (groups of tones), each of them transmitted to a different MS (associated with that first BS) with different power level (e.g. according to path loss and interference encountered by the MS). An interfered MS belonging to a second BS receives a sub-channel from second BS but is interfered by the signal sent by the first BS. By permuting differently the tones and first BS and second BS, the tones interfering the sub-channel received by interfered MS will belong to many different sub-channels of the first BS. Therefore it is unlikely that the interfered sub-channel will be hit only by high power interference, and typically it would be hit by many different interference power levels (from different sub-channels), and therefore interference would be averaged. This desirable averaging effect occurs due to different MS transmitting with different permutations. The interference averaging effect could have been useful for frame MAP (control channel) data as well since the frame MAP is typically transmitted on a subset of all available tones. The other tones (not transmitting the frame MAP) may be either quiet or be used to transmit lower power data bursts. Therefore by interference averaging achieved through different permutations, the interfered MS receiving its frame MAP, will be partially hit by lower power non-map transmission of other interfering BS which will be easier to handle.

However, since WiMAX frame Maps use the same permutation for all base stations, this desirable interference averaging effect does not occur. Other tools available to counter interference are scheduling the MS transmission only at times when its CINR (Carrier to interference and noise ratio) is high, and/or using retransmissions (HARQ, hybrid ARQ). Unfortunately, none of these techniques are applicable to frame MAP transmission. Frame MAPs must be transmitted all the time to all of the MSs, therefore scheduling is not the answer. Moreover while the frame MAPs provide the retransmission mechanisms (HARQ) for protecting the data bursts, they are not themselves protected by a retransmission mechanism. In other words frame MAPs should be reliably received on the first reception.

A mechanism is therefore needed to allow WiMAX to be deployed in reuse-1 for frame MAPs as well as for data.

SUMMARY OF THE INVENTION

It is an object of the present invention to provide a method and apparatus that allow efficient utilization of the bandwidth available in wireless networks.

It is yet another object of the present invention to provide a method and device for improving coverage of control channel (sometimes referred to as map of transmissions), and particularly in cases where frequency planning cannot provide sufficiently good results.

It is another object of the present invention to provide a method and apparatus to enable deployment of systems that can operate at the same frequency band under different standards or even under non-standard compatible conditions.

It is yet another object of the present invention to provide a method and an apparatus to ensure a pre-determined required quality of service for users operating in the same network but under different communication standards of operating conditions, e.g. where some of the users are standard compliant while others are non-standard compliant.

It is a further object of the present invention to enable improved transmission of operating frame MAPs to the users' MSs to manage the network operation.

Other objects of the invention will become apparent as the description of the invention proceeds.

Thus, in accordance with the present invention there is provided a method for allocating transmission resources in a wireless communications network comprising at least one base station and a plurality of subscriber terminals associated therewith, out of which at least one of the subscriber terminals is operative to communicate with said at least one base station in accordance with a first communication protocol by exchanging standardized protocol compatible communication frames, and at least one of the remaining subscriber terminals is operative to receive communications from said at least one base station in accordance with a second communication protocol, wherein the second communication protocol is associated with non-standardized communication frames, or with communication frames that are compatible with a second (different) standardized protocol. The method for allocating transmission resources for communications between the at least one base station and the at least two subscriber terminals described above, is characterized in that:

the base station is operative to transmit a plurality of communication frames' types, wherein at least one of these types is associated with communication frames that are compatible with the first communication protocol and at least one other of these types is associated with communication frames that are compatible with the second communication protocol, and wherein the at least one subscriber terminal being operative to receive communication frames of the second communication protocol transmitted by the at least one base station, is capable of decoding communication frames compatible with both the first and second communication protocols received thereat, and the at least one subscriber terminal being operative to communicate with the at least one base station by exchanging communication frames of the first communication protocol is capable of decoding only standardized communication frames of the first communication protocol that are received thereat.

In other words, the mechanism proposed by the present invention, comprises essentially sending two (or more) types of frames. One type of frames is standardized frames (e.g. WiMAX frames), and any MSS that is in compliance with the first communication protocol may receive and decode these frames. However standard WiMAX frames are not sufficiently protected for Reuse-1 operation, such that not all MSS may read them successfully. For example only 85% of the MSS may be able to read standard WiMAX frames.

The second type of frames is associated with the second communication protocol. A frame compliant with the second communication protocol would preferably begin with a frame MAP that has different permutation per cell (similar to the data zones). A second communication protocol compliant MSS will be able to read and decode these frame MAP zones, thus such MSS would be better protected for reuse-1 operation. For example 97% of the MSS will be able to read such second protocol compliant frames. For example Base station may send standard WiMAX frames on all odd numbered frames, and in addition send second protocol compliant frames on all even numbered frames.

The terms "non-standard compliant frames" or "non-standardized communication frames" etc., as used herein throughout the specification and claims, should be understood to encompass frames which are not compatible with protocol(s) commonly used in the industry but can be received and decoded by an enhanced MSS, i.e. an MSS that is a second protocol compliant is able to receive the enhanced frames (i.e. the non-standard compliant frames and/or frames that are associated with the second different standardized protocol) referred to herein.

According to a preferred embodiment of the invention, the at least one base station is operative to send alternate types of communication frames, i.e. each first protocol compliant frame is followed by a second protocol compliant frame, and vice versa. Thus, when considering a standard WiMAX MSS, it will not disconnect even though it would not receive and decode correctly a significant part of the frames (e.g. 50%). The reason being that each such MSS operative in accordance with this embodiment of the present invention, failing to a receive and properly decode a frame would start a failure counter and only after a significant number of frames has been lost (e.g. 20 frames), the MSS would disconnect. However since in accordance with this embodiment every standard compliant frame is followed by a non-standard compliant frame, the MSS will reset its failure counter every second frame and would not disconnect.

In the alternative, every frame that is compliant with the first communication protocol frame is proceeded by a plurality of frames which are in compliance with the second communication protocol, where the number of consecutive comprising that plurality of second communication protocol complying frames is selected to ensure that MSS that is operative in compliance with the first protocol will be able to reset its failure counter and would not disconnect every such cycle.

Preferably, the at least one subscriber terminal operative to communicate with the at least one base station by exchanging standardized communication frames, is adapted to read every second frame (e.g. only odd frames), whereas the at least one subscriber terminal operative to receive frames that are in compliance with the second communication protocol transmitted by the at least one base station, is adapted to read and decode every frame.

Thus, if the at least one base station scheduler always schedules standard MSS on standard WiMAX frames, these MSS will not sustain frame losses. On the other hand, the second communication protocol compliant MSS may be scheduled on all frames, since they can handle both standard and enhanced frames.

As should be appreciated by those skilled in the art, carrying out the method provided by the present invention while using a super frame which comprises a plurality of frames, where at least one of this plurality of frames is compatible with a first communication protocol while at least one other of the plurality of frames is compatible with a second communication protocol, should be understood as a mere implementation of the method provided and thus as being encompassed by the present invention.

According to another embodiment of the invention, the method provided can be implemented mutates mutandis in a network comprising MSS that are compliant with two or more different standards. In such a case, alternating between frames that are intended for one standard and then the other standard, each MSS compliant with one standard would interpret frames compliant with the other standard as being erogenous frames.

Similarly, the method provided by the present invention can be implemented in a network comprising MSS that are compliant only with two or more different standards (i.e. no non-standard compliant MSS) along the lines explained above.

According to another aspect of the present invention, there is provided a base station adapted for use in a wireless communication network which comprises a plurality of subscriber terminals. Out of this plurality of subscriber terminals, at least one subscriber terminal is operative to communicate with the base station by exchanging standardized protocol compatible communication frames and at least one other subscriber terminal is operative to receive from the base station second communication protocol frames. The base station comprises:

a scheduler operative to determine time frames at which the at least one subscriber terminal being capable of communicating with the base station by exchanging standardized protocol compatible communication frames, would be operative to communicate with the base station by using such standardized protocol compatible communication frames, and to determine time frames at which the at least one other subscriber terminal would be operative to receive second communication protocol frames;

a transmitter operative to transmit standardized protocol compatible communication frames which can be decoded by all subscriber terminals receiving these communication frames, and second communication protocol compatible frames which can be decoded only by second communication protocol compatible subscriber terminals receiving these communication frames.

According to a preferred embodiment of this aspect of the invention, the scheduler is operative to schedule alternate types of standardized and communication frames of the second communication protocol. In other words, the scheduler is operative to schedule standardized protocol compatible communication frame followed by one or more second communication protocol compatible frame, and vice versa.

DETAILED DESCRIPTION OF PREFERRED EMBODIMENTS

A better understanding of the present invention is obtained when the following non-limiting detailed description is considered in conjunction with the drawings.

In systems operating under the WiMAX standard, the frame MAP zone is transmitted using permutation base zero for all the sites. This is in contrast to data zones that are transmitted with different permutation for different cells therefore facilitating interference averaging. Different cells still need to be identified by some "code". The code used is the IDCell which is a number 1 . . . 114 that is embedded/ identifies the preamble. In accordance with the present invention, an enhanced non-standard frame Map transmission scheme is used, by which the BS uses the IDCell as the permutation base (i.e. by which the permutation is selected) for part of the frames. This guarantees for the enhanced scheme that the permutation of neighboring cells will be different since the IDCell is not repeated for neighboring cells, as otherwise their preambles will be indistinguishable. Furthermore, each cell will transmit the MAP on only a part of the bandwidth for example on one third (Load=⅓'rd). The combination of partial transmission and interference averaging gains 10*log 10(1/Load) is ~4.8 dB in our example, for the enhanced scheme with respect to reuse-1 with full collisions. The interference averaging is taken into consideration when adjacent cell is in partial loading. In that case, the selection of permutation by Cell ID, would guarantee that desired cell tones would collide with about ⅔ of the quiet tones, and therefore would average the adjacent cell interference. Without different permutations (as is the case today), a partially loaded desired cell is likely to collide with all loaded tones of the adjacent cell.

When reuse-1 and reuse-3 do not work, then alternating between reuse-1 and non-standard partially loaded reuse-1 (for edge, hard to cover MSS) would allow standard operation for the "in cell" MSS, and non-standard operation for "cell edge" MSS.

Figure 1:
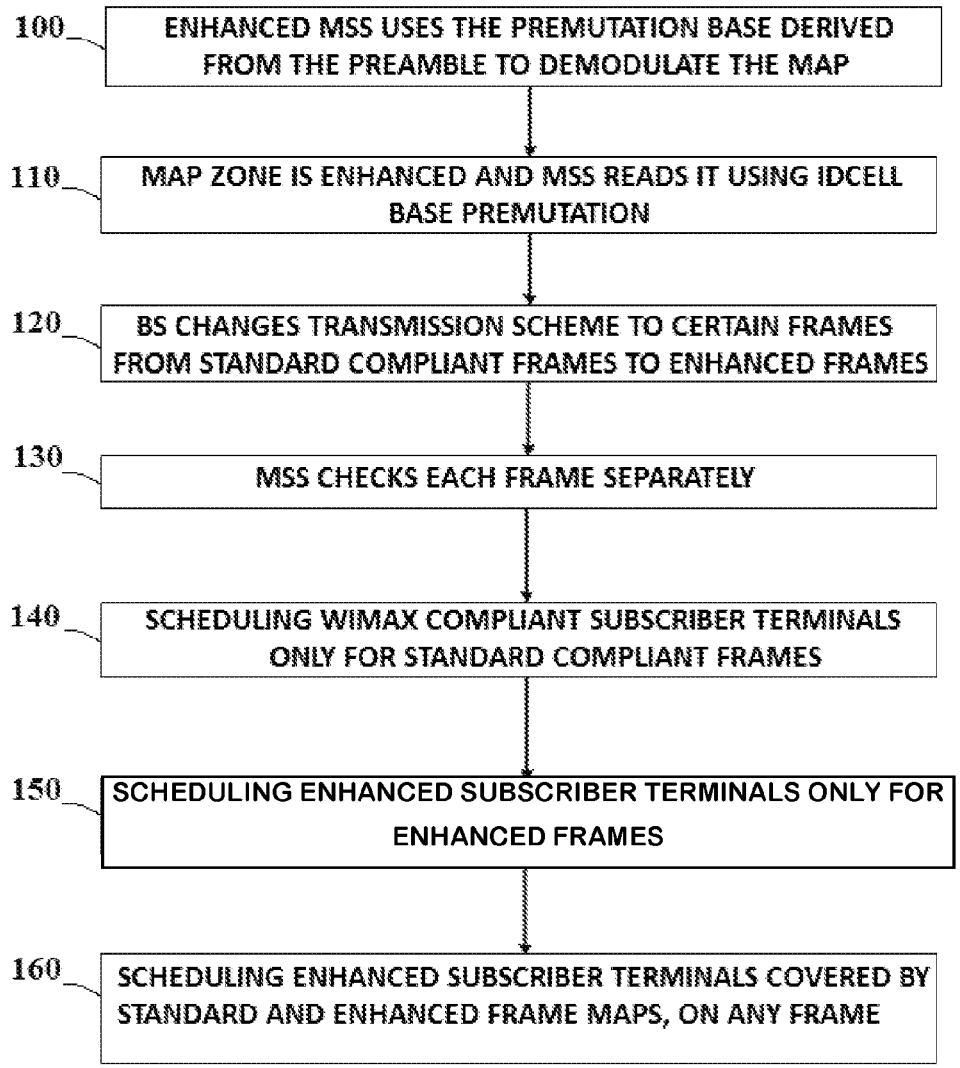
FIG. 1—presents a flow chart demonstrating the method provided by the present invention.

An enhanced MSS (mobile subscriber system) that is aware of the enhanced MAP transmission scheme, needs to operate as exemplified in FIG. 1. The enhanced MSS first uses the permutation base read from the preamble in order to demodulate the frame MAP (step 100). If the frame MAP is successfully read using the permutation base (i.e. CRC check is successful), then this frame MAP zone is enhanced and MSS reads it using the IDCell base permutation (step 110). On the other hand if frame MAP was not read successfully using the IDCell, then permutation zero is used. In accordance with the present invention, the BS may change the transmission scheme for each frame from a standard compliant frame to the second protocol compliant (enhanced) frame (step 120). The frequent alternation between enhanced and standard frame MAP transmission scheme allows standard MSS to connect to enhanced BS, in addition to enhanced MSS connecting to enhanced BS.

Therefore an enhanced MSS needs to check each frame separately (step 130). Transmission mode of one frame cannot be assumed for subsequent frames. In some implementations the frame MAP alternating scheme may be fixed allowing the enhanced MSS to learn it with time. This can save the need for the enhanced MSS to try to receive both frame MAP modes.

Let us assume that some of the subscriber terminals are WiMAX compliant terminals, while other subscriber terminals in that network are compliant with a second communication protocol. In order to utilize the two types of frames as efficiently as possible, the BS scheduler should preferably carry out the following scheduling scheme:
1. Schedule WiMAX compliant subscriber terminals only on first protocol compliant frames (step 140).
2. Schedule enhanced subscriber terminals that are on cell edge, and therefore are not covered on standard compliant frames, only in enhanced frames (step 150).
3. Schedule enhanced WiMAX MSS, that are covered both by standard and enhanced frame map, on any frame (step 160).

These constraints would prevent MSS loosing frames either due to lack of compliance (to enhanced frame MAPs) or poor cell coverage of standard frame MAP (bad radio conditions).

As another example let us define an air interface that is a superset of the WiMAX (more advanced and backward compatible) standard. Changing the frame MAP zone would prevent those WiMAX only compliant subscriber terminals from connecting and therefore prevent backward compatibility. This problem can be solved by using the present invention, so that a portion of the frame MAPs will be transmitted using the new air interface, while the rest will be transmitted using legacy WiMAX. On one hand WiMAX compliant terminals can connect to the standard WiMAX frame maps, and on the other hand enhanced features can be added to the new frame MAPs.

Let us now consider a particular example of incorporating transmissions that are compatible with the WiMAX Forum Mobile System Profile as is currently defined and transmissions that are compatible with the futuristic version thereof (e.g. in accordance with IEEE 802.16m). According to the current version, the control channel (the map zone) is transmitted at the rate of ½ Quadrature Phase Shift Keying method (QPSK ½) where the single degree of freedom in maps transmission is the number of repetitions that provide an additional time-diversity mechanism. A Base Station that implements this procedure may further implement a delay-diversity algorithm (e.g., linear or cyclic) in order to provide spatial diversity, thereby providing a better cell-coverage.

Still, maps are the limiting factor of WiMAX Down Link system coverage and capacity, as they are the least protected entity in the frame: they are not HARQ protected and diversity transmission methods (e.g. space time coding ("STC")) are prohibited from being implemented thereon. Furthermore, maps' zone suffers from reduced permutations capability since the outer permutation (cluster reordering) does not exist and the inner permutation (sub-carrier to sub-channels mapping) is determined according to preamble ID CELL. The maps can be transmitted in either Reuse-1 or Reuse-3 scheme where the trade-off in performance and decision between the two schemes is up to the BS vendor (and the operator), and their reception quality depends on the MS receiver type, e.g., MRRC, MMSE etc.

Currently the WiMAX allows transmission of the maps only as a single input multiple output ("SIMO") zone (1 BS TX antenna, 2 MS RX antennas) therefore most of the BS vendors apply antenna virtualization methods like cyclic delay diversity ("CDD") or Linear Delay Diversity ("LDD") to enhance cell radius and coverage. CDD (taken as an example) increases the frequency selectivity of the channel without decreasing the multi-path immunity of the MS or increasing the channel delay spread. Nevertheless, it is known that CDD degrades the performance in line of sight (LOS) channels. For improving the map resiliency and thus system coverage, according to a preferred embodiment of the present invention, in the futuristic version, the Base Station implements Alamouti scheme for maps transmission, instead of delay diversity techniques. Since the Alamouti scheme (code) is known in art to be an optimal space-time code in terms of maximizing diversity, one may achieve optimized cell coverage by using this scheme, while still being able to maintain backward compatibility.

From the point of view of the receiver, the effect of the Alamouti code in a multipath fading scenario is perceived to be similar to an Additive White Gaussian Noise ("AWGN") channel, whereas CDD reduces the correlations between channel fading coefficients in the frequency direction. At the MS receiver, the Alamouti decoding scheme is Maximum Likelihood ("ML") and employs a linear receiver. Additionally, in LOS scenarios there is a clear advantage of Alamouti code over CDD.

In order to solve the backward compatibility with receivers compatible with the second (new standard or non-standard) communication protocol, the first zone is coded with STC and frames carrying the first zone and other zones will be decoded by these (enhanced) receivers. During frames where first zone is STC encoded the legacy MS may keep synchronization pending on preamble reception though it will not receive transmissions in these frames (since they cannot decode the MAP). The time division ratio (frames with STC in the MAP zone vs. frames with regular encoding in the MAP zone) can be provisioned or changed dynamically based on the policy of the operator. This may accomplished for instance by adding parameters that describe this time division. Frames transmitted in the regular encoding (compatible with a first communication protocol) will be transmitted with a CDD scheme in the MAP zone (or without it), so in fact there will be no changes that will be noticed thereat.

By another embodiment of the invention, MAPs of frames that belong to the current WiMAX standard are transmitted with delay-diversity methods while maps of frames that belong to the futuristic standard (first communication protocol in the paragraph above) are transmitted using the Alamouti code. Preferably, the ratio between the standard (legacy) frame and the futuristic frame is configured by external software.

Figure 2:
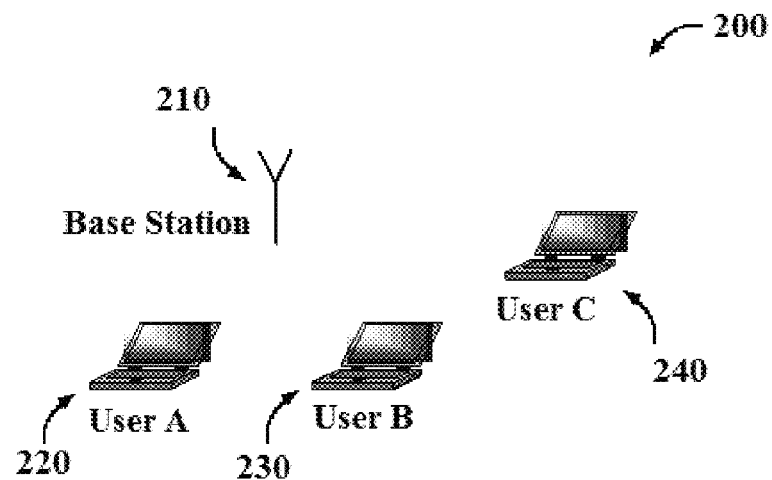
FIG. 2—illustrates a simplified system operating in accordance with the present invention.

FIG. 2 illustrates an example of a simplified system 200 comprising a Base Station 210 and three users' terminals 220, 230 and 240 communicating with that Base Station. The communication protocols used in these terminals are different. User A (terminal 220) uses a standard Mobile WiMAX air protocol, while User B (terminal 230) uses a non standardized air protocol and User C (terminal 240) uses a future generation WiMAX communication protocol. The Base Station supports all three communication protocols.

Figure 3A:
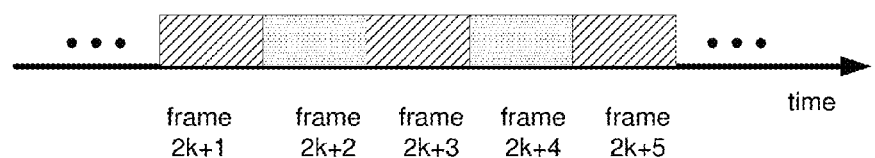
FIGS. 3A and 3B—present examples of interleaving frames that are compatible with the first protocol with frames that are compatible with the second protocol, for transmission by the base station.

FIG. 3A is an example where a Base station sends standard WiMAX frames on all odd numbered frames, and in addition sends non-standard compliant frames on all even numbered frames.

Figure 3B:
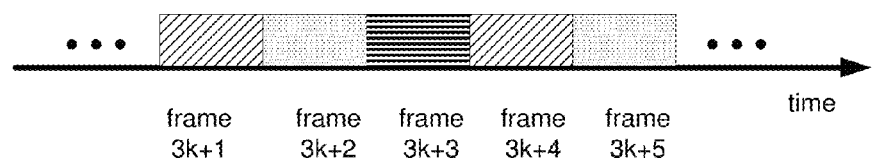

FIG. 3B is another example where a Base station sends standard WiMAX frames on all frame numbers that when divided by 3 have a remainder of 1, and in addition sends non-standard compliant frames on frame numbers that when divided by 3 have a remainder of 2. In addition, the Base Station sends alternative standard compliant frames on frame numbers that when divided by 3 have a remainder of 0.

As will be appreciated by those skilled in the art, the example provided shows the use of alternate maps. However, similar processes may be applied in a similar way in order to accommodate different network's compositions of standard and non-standard compliant terminals, without departing from the scope of the present invention.

It is to be understood that the above description only includes some embodiments of the invention and serves for its illustration. Numerous other ways of carrying out the methods provided by the present invention may be devised by a person skilled in the art without departing from the scope of the invention, and are thus encompassed by the present invention.

The invention claimed is:

1. A method for allocating transmission resources in a wireless communications network that comprises at least one base station and a plurality of subscriber terminals associated therewith, out of which at least one of said subscriber terminals is operative to communicate with said at least one base station in accordance with a first communication protocol by exchanging separated standardized protocol compatible communication frames, and at least one of the remaining subscriber terminals is operative to receive communications from said at least one base station that are compatible with a second communication protocol, wherein the second communication protocol is associated with non-standardized separated communication frames, or with communication frames that are in accordance with a second standardized protocol, said method comprising:

transmitting by said base station a plurality of separated communication frames' types, wherein at least one of said types is associated with separated communication frames that are compatible only with said first communication protocol and at least one other of said types is associated with separated communication frames that are compatible only with said second communication protocol, wherein said base station is further configured to frequently alternate the transmission for each frame of said plurality of separated communication frames' types from said standardized protocol compatible communication frames to said non-standardized separated communication frames; and decoding communication frames received by said at least one subscriber terminal that are compatible only with said first communication protocol or decoding separated communication frames that are compatible only with said second communication protocol, and whereas the at least one subscriber terminal being operative to check if said frame is successfully read then categorizing said frame as a nonstandard frame and reading said frame using base permutation and if said frame is not successfully read then reading said frame using permutation zero.

2. The method according to claim 1, wherein alternate types of separated communication frames that are compatible only with the first protocol and separated communication frames that are compatible only with the second protocols are transmitted by said base station.

3. The method according to claim 1, wherein a separated standardized communication frame that is compatible only with the first communication protocol is transmitted by said base station following transmission of two or more separated communication frames that are compatible only with said second communication protocol.

4. The method according to claim 1, further comprising a step whereby said at least one base station transmits information related to the allocation of transmission resources to said at least one subscriber terminal operative by receiving second communication protocol's frames by using a sub-channel frequency.

5. The method according to claim 1, wherein said first communication protocol is the WiMAX Forum Mobile System Profile in accordance with IEEE 802.16e and wherein said second communication protocol is compatible with IEEE 802.16m.

6. The method according to claim 1, wherein said second communication protocol comprises utilizing Alamouti scheme for transmission of frame MAPs.

7. The method of claim 1, wherein said base station uses an IDCell as a permutation base for part of the frames.

8. The method of claim 1 wherein said alternation is not fixed.

9. The method of claim 1 wherein said alternation is fixed.

10. A base station adapted for use in a wireless communication network comprising a plurality of subscriber terminals out of which at least one subscriber terminal is operative to communicate with said base station by exchanging separated standardized protocol compatible communication frames and at least one other subscriber terminal is operative to receive second separated protocol communication frames, wherein the second protocol is associated with non-standardized communication frames, or with communication frames that are compatible with a second standardized protocol, and comprising:

a scheduler operative to frequently alternate a transmission between said standardized protocol compatible communication frames and non-standardized communication frames, or with communication frames that are compatible with a second standardized protocol and to determine time frames at which said at least one subscriber terminal would be operative to communicate with said base station by exchanging separated communication frames that are compatible only with said standardized protocol, and to determine time frames at which said at least one other subscriber terminal would be operative to receive separated communication frames that are compatible only with said second protocol transmitted by said base station;

a transmitter operative to transmit separated communication frames that are compatible only with said standardized protocol which can be decoded by all subscriber terminals receiving said separated communication frames, and communication frames that are compatible only with said second protocol which can be decoded only by enhanced subscriber terminals receiving said separated second protocol communication frames, wherein said decoding is utilized according to a base permutation for the said standardized protocol and according to permutation zero for said second protocol.

11. The base station according to claim 10, wherein said scheduler is operative to schedule alternate types of separated communication frames that are compatible only with the standardized protocol and separated communication frames that are compatible only with the second protocol.

12. The base station according to claim 10, wherein said scheduler is operative to schedule separated communication frames that are compatible only with the standardized protocol following scheduling for transmission of two or more separated communication frames that are compatible only with said second protocol.

13. The base station according to claim 10, wherein said standardized communication protocol is the WiMAX Forum Mobile System Profile in accordance with IEEE 802.16e and wherein said second communication protocol is compatible with IEEE 802.16m.

14. The base station according to claim 10, wherein said second communication protocol comprises utilizing Alamouti scheme for transmission of frame MAPs.

\* \* \* \* \*